United States Patent Office 2,860,076
Patented Nov. 11, 1958

2,860,076

DYNAMOELECTRIC BRUSH

Paul Smisko, St. Marys, Pa., assignor to Stackpole Carbon Company, St. Marys, Pa., a corporation of Pennsylvania No Drawing. Application January 28, 1957
Serial No. 636,500

4 Claims. (Cl. 117—224)

This invention relates to dynamoelectric brushes for use in sliding contact with metallic current collecting elements of dynamoelectric machines. The term "dynamoelectric brushes" as used herein contemplates brushes of the well-known carbon, electrographitic, and metal-graphite types, and is to be so understood in the following specification and claims.

Brushes of this type comprise a body of electrically conductive carbonaceous material such, for example, as graphite or coke, and mixtures thereof, with or without other substances such as lamp black or metallic additions. The carbonaceous material in finely divided form is mixed with a temporary binder, such as pitch or resin, the mixture is molded to form plates, or blocks, that are subsequently heated with production of a residual carbon bond resulting from the binder. The nature, compositions, and modes of producing such brushes are well known.

Although brushes performing satisfactorily at the earth's surface were produced for many years, more recently it was found that at high altitudes or under conditions of low humidity brushes of the general type referred to became subject to severe and rapid wear with great reduction in their operating life, in extreme cases to but a few minutes. That phenomenon is commonly referred to as dusting. After that difficulty was encountered brushes impregnated with various inorganic materials were developed that afforded prolonged life at high altitudes in comparison with ordinary brushes. Experience showed, however, that dusting still occurred at high altitudes unless the commutator, slip ring or the like which the brush contacts was given a preliminary conditioning treatment at the earth's surface prior to putting the dynamoelectric device into operation at high altitude. In other words, the best of the high altitude brushes containing inorganic material if installed in a newly assembled generator with unused commutator surfaces and taken immediately to high altitude underwent dusting. As a result the practice was to run in the metallic current collecting element against the improved brushes for periods of many hours at earth level. Obviously, that was disadvantageous in that is entailed delays in production of dynamoelectric devices for use in aircraft or under conditions of very low humidity. Likewise, it was found that despite having prolonged life as compared with untreated brushes, those originally available for such use operated at undesirably high temperatures, even with pre-conditioned commutator surfaces.

Those disadvantages were minimized or overcome by the brushes disclosed and claimed in Patent No. 2,739,912, issued on an application filed by me. The invention of that patent was predicated upon my discovery that the troubles just alluded to are overcome by dynamoelectric brushes having incorporated therein lithium carbonate ($Li_2CO_3$) in an amount from about 0.5 to 20 percent by weight. Experience showed that brushes in accordance with that patent possess the important advantage that they may be installed for operation with untreated commutators, or other current collecting elements, and immediately taken to high altitude for operation there without impairment of their desirable qualities. Thereby the pre-conditioning of current collecting elements that was necessary prior to that invention was eliminated. Furthermore, experience showed that brushes in accordance with that patent operate at lower average temperatures and undergo substantially reduced wear per unit time as compared with the best of the high altitude brushes known previously.

Further experience with brushes in accordance with the aforesaid patent has shown that despite their satisfactory behavior and improved characteristics, as just described, they develop high friction when operated at no load or under light loads, which inherently results in high wear of the commutator, or like element, or of the brush, or both.

The primary object of the present invention is to provide brushes containing lithium carbonate in accordance with my aforesaid patent and which possess the advantages of those brushes, and which additionally do not develop high friction, with consequent objectionable commutator or brush wear, when operated at no load or at low load.

A further object is to provide brushes in accordance with the foregoing object which operate at lower temperatures than those of the aforesaid patent.

Still another object is to provide a method of making brushes in accordance with the present invention that is simple, easily practiced with readily available apparatus and materials, and is efficient in producing brushes having the characteristics of those of the invention.

Other objects will be recognized from the following specification.

The invention is predicated upon my discovery that its stated objects are attained by the conjoint use in a dynamoelectric brush of lithium carbonate in accordance with my Patent No. 2,739,912 and silver iodide ($AgI$). I have found by experience that such brushes containing both lithium carbonate and silver iodide possess the desirable properties of brushes containing lithium carbonate alone but additionally, and importantly, show lower commutator wear, lower brush temperatures, and no greater brush wear when operated at no load or under light load. Furthermore, under full load the $AgI$—$Li_2CO_3$ brushes of this invention show lower brush wear, low commutator wear and lower brush temperatures than do the brushes made in accordance with the aforementioned patent. Thus, the range of applicability of lithium carbonate impregnated brushes is materially extended by those of the present invention.

In the production of brushes in accordance with this invention the lithium carbonate may be supplied by impregnation according to any suitable procedure but preferably in accordance with any of those described in detail in Patent No. 2,739,912. The impregnation may be such that the brush will contain from about 0.5 to about 20 percent by weight of lithium carbonate. For most purposes, however, it is preferred that the lithium carbonate content be from about 6 to 12 percent, and preferably about 7 to 8.5 percent.

Similarly, the silver iodide of this invention may be supplied to the brush in various ways, and most suitably in an amount such that the brush will contain from about, by weight, 0.5 to 15 percent, preferably about 3 to 4 percent for most purposes.

In the preferred practice of the invention the silver iodide is supplied by placing the brush stock, for instance in the form of plates, in a vacuum apparatus which is then evacuated, suitably to a pressure of the order of 10 mm. Hg, whereupon there is introduced an aqueous 20 percent solution of silver nitrate ($AgNO_3$). After the plates have become impregnated with the solution they are removed and dried, for instance at 150° C. for four hours. The thus impregnated plates are then soaked in a solution of iodine (I) in alcohol, suitably of 10 percent strength, for two hours. The iodine reacts with the silver nitrate to deposit silver iodide dispersed in the pores of the brush stock. The plates are then dried, for example at 150° C. for four hours. To insure complete conversion of the silver nitrate to silver iodide, the plates may then be resoaked for an additional two hours in the 10 percent iodine solution, followed by drying in the same manner. Of course, the strength of the solutions, the times of immersion, the temperatures and times of drying may be varied within wide limits. As a result of the processing in the manner described the plates gain approximately 3 to 4 percent by weight of silver iodide distributed through the pores of the material.

In the preferred practice the plates are first impregnated with silver iodide and then with lithium carbonate, for instance, to repeat, by the various procedures of the aforementioned patent, to which reference may be made to avoid needless repetition herein.

The benefits of the invention will be recognized from typical tests that have been made using a standard aircraft generator rated at 30 volts, 400 amperes, and 3,000 to 8,000 R. P. M. The full load tests were in accordance with regular Air Force sea level qualification specifications which included running at 30 volts, 400 amperes, and 6,000 R. P. M. The no load tests were conducted at 300 volts, zero amperes, and 6,000 R. P. M.

The following Table I shows the comparative results of 24-hour no load tests of brushes impregnated with lithium carbonate in accordance with my aforementioned patent, brushes containing 3 to 4 percent of silver iodide, and brushes in accordance with this invention.

TABLE I

*No load tests*

| Brush With— | Brush Wear, .001″ Per Hour | Comm. Wear, Inches Per 1,000 Hours | Brush Temperature Rise, Degrees Centigrade |
|---|---|---|---|
| 1. Lithium Carbonate per 2,739,912 | 0.21 | .021 | 163 |
| 2. Silver Iodide 3-4% | 15.1 | .143 | 102 |
| 3. Lithium Carbonate per 2,739,912 plus 3-4% silver iodide | 0.21 | (¹) | 108 |

¹ No measurable wear.

It will be observed that the wear of brushes 1 and 3, respectively, in accordance with the foregoing patent and with this invention showed the same brush wear which was but a small fraction of the wear of brush 2, containing silver iodide alone; commutator wear with brush 3 showed no measurable wear while commutator wear using brushes 1 and 2 was appreciable; and that the silver iodide (2) and the $AgI$—$Li_2CO_3$ brushes operated at greatly reduced temperatures as compared with brush 1, containing lithium carbonate alone.

Essentially similar results were obtained under full load operation during 100 hours in the manner mentioned above, as appears from Table II.

TABLE II

*Full load tests*

| Brush With— | Brush Wear, .001″ Per Hour | Comm. Wear, Inches Per 1,000 Hours | Brush Temperature Rise, Degrees Centigrade |
|---|---|---|---|
| 1. Lithium Carbonate per 2,739,912 | 0.38 | .033 | 147 |
| 2. Silver Iodide 3-4% | 7.28 | .227 | 127 |
| 3. Lithium Carbonate per 2,739,912 plus 3-4% silver iodide | 0.23 | .018 | 128 |

The data of Tables I and II show that the addition of silver iodide to brushes containing lithium carbonate involves a synergistic effect, the mechanism of which is not understood. That this is so appears from a comparison of the results of the brushes of this invention with those containing silver iodide alone and lithium carbonate alone, as is perfectly evident from the fact that the results with the former are the reverse of additive of the results of the latter.

Apparently among silver compounds this action is unique to silver iodide for brushes containing lithium carbonate in accordance with my aforesaid patent and 4 percent of silver sulfate ($Ag_2SO_4$) when operated under no load during 24 hours showed a 209° temperature rise and 0.023 inch commutator wear per 1000 hours, which may be compared with the foregoing data.

The brushes of these tests were all of the same grade of carbon, processed in the same manner, and tested on the same type machine under the same conditions.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A dynamoelectric brush comprising a body of electrically-conductive carbonaceous material having, by weight, from about 0.5 to 15 percent of silver iodide and about 0.5 to 20 percent of lithium carbonate distributed in the body.

2. A brush according to claim 1, the brush being a carbon bonded body of electrographitic material.

3. A brush according to claim 1 in which the content of lithium carbonate is about 6 to 12 percent.

4. A brush according to claim 1 containing about 7 to 8.5 percent of lithium carbonate and about 3 to 4 percent of silver iodide.

References Cited in the file of this patent

UNITED STATES PATENTS

| 2,414,514 | Elsey | Jan. 21, 1947 |
| 2,739,912 | Smisko | Mar. 27, 1956 |